No. 652,750. Patented July 3, 1900.
J. CURRIN.
SPECTACLE FRAME.
(Application filed May 25, 1899.)
(No Model.)
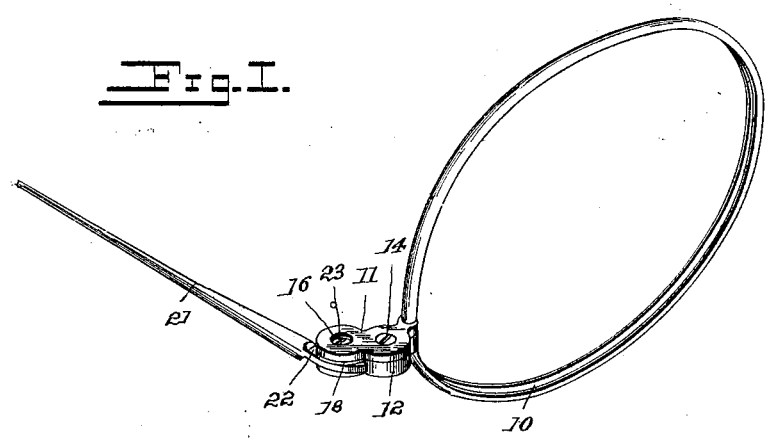
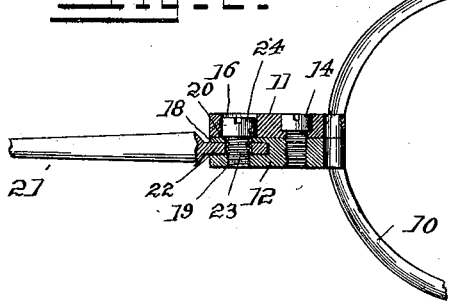
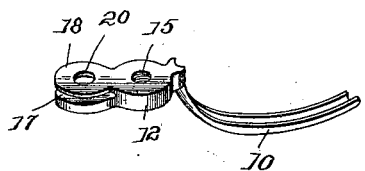
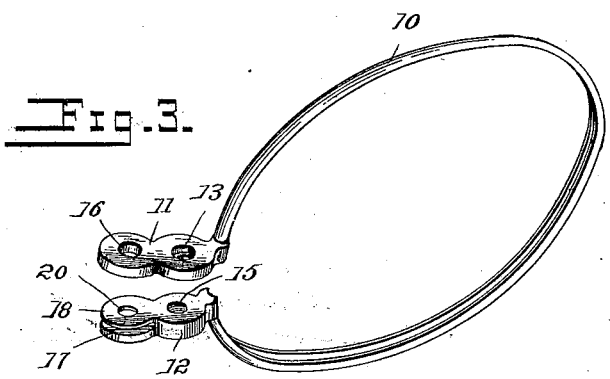
Witnesses
F. E. Alden
H. F. Beruhes
John Currin, Inventor.
By his Attorneys,
C. A. Snow & Co.
THE NORRIS PETERS CO., PHOTO-LITHO., WASHINGTON, D. C.

UNITED STATES PATENT OFFICE.

JOHN CURRIN, OF PROVIDENCE, RHODE ISLAND.

SPECTACLE-FRAME.

SPECIFICATION forming part of Letters Patent No. 652,750, dated July 3, 1900.

Application filed May 25, 1899. Serial No. 718,146. (No model.)

*To all whom it may concern:*

Be it known that I, JOHN CURRIN, a citizen of the United States, residing at Providence, in the county of Providence and State of Rhode Island, have invented a new and useful Spectacle-Frame, of which the following is a specification.

My invention relates to improvements in spectacle-frames, and it is more particularly directed to frames of that class wherein the end pieces are separably connected by a clamping-screw to open the lens-frame without disturbing the attachment of the temple, the latter being pivoted to one end piece, thus allowing the temple to remain undisturbed in its position for inserting a glass into or removing it from the lens-frame and also permitting the temple-screw to be removed for disengagement of the temple without manipulating the screw that confines the end pieces of the frame together.

In the use of spectacles it is desirable to provide a means for holding the temple against loose swaying play on its pivot, and in some prior devices with which I am familiar this end has been attained by employing a spring-washer adapted to be compressed between the temple and the head of the temple-screw, so as to exert frictional pressure on said temple for holding it in place. It is obvious that the provision of any tension device which plays with the temple has a tendency to turn the screw and make it work loose, and this is true particularly in the case of the spring-washer, because the latter presses against the head of the pivot-screw and works in contact with the movable temple.

The object of the present improvement is to devise a construction of spectacle-frame of the class above specified which will be extremely simple in construction, cheap of manufacture, permit easy assemblage of the temple and adjustment of the lens-frame, and, above all, provide for the application of frictional pressure on the temple to hold it in place without, however, exposing the temple-pivot to such conditions as will permit it to work loose owing to movement of the temple on its pivot-screw.

With these ends in view my invention consists in slitting one end piece of the lens-frame to provide a yieldable jaw, a temple having its eye fitted in the slit portion of the end piece, and a pivot-screw having threaded engagement with the slitted end piece and arranged for its head to force the jaw into frictional contact with the temple-eye for the purpose of holding the latter against loose swaying movement and without exposing the screw to the swaying adjustment of the temple on its pivotal connection with the end piece, all as will be hereinafter more fully described and claimed.

In the drawings, Figure 1 is a perspective view of one lens-frame with the temple attached by a joint of my invention. Fig. 2 is an enlarged transverse section through the joint. Fig. 3 is a detail perspective view showing the lens-frame opened, but with the temple held frictionally by my improved pivotal joint. Fig. 4 is a detail perspective view of a part of the lens-frame with one end piece, showing the temple removed therefrom.

The same numerals of reference are used to indicate like and corresponding parts in each of the several figures of the drawings.

As is usual in the art, the lens-frame 10 is divided on the outer side thereof, and the terminal portions of this divided frame are provided with end pieces 11 12 of corresponding form and size, so that the upper end piece may overlap the lower end piece for compact assemblage of the elements constituting the joint for the divided lens-frame. The end piece 11 has a transverse threaded aperture 13, through which passes the fastening-screw 14, adapted to work in a tapped or threaded aperture 15 of the end piece 12, and the end piece 11 is also provided near its outer end with a socket or aperture 16, adapted to receive the head of the pivot-screw that holds the temple in place on the end piece 12.

According to my invention the end piece 12 is divided in a longitudinal direction by a kerf or slit 17, which opens through the outer extremity of said end piece and extends inwardly toward the threaded socket 15, adapted to receive the clamping-screw, by which the two end pieces are fastened separably together. The slit or kerf 17 is produced in the end piece 12 on a line near the upper face of said end piece, and this construction provides a yieldable jaw 18, which forms an integral part of the end piece 12 and is adapted to exert frictional pressure upon the temple-eye. The lower part of the divided end piece 12 is provided with a threaded aperture 19, while the jaw 18 has a smooth aperture 20, which is disposed in alinement with the threaded aperture 19. The temple-arm 21 may be of the usual or any approved construction familiar to those skilled in the art, and said arm is provided with a flattened portion 21, in which is produced the eye for the reception of the pivot-screw 23. This pivot-screw is adapted to pass through the smooth aperture 20 of the yieldable jaw 18 and the eye of the temple 21, so that the threaded portion of the screw will engage with the threaded aperture 19 of the end piece 12. This screw has a head 24, which bears upon the yieldable jaw, and thus the shank of the screw engages with the threaded wall of the aperture 19, while its head 24 bears upon the yieldable jaw 18. The screw is adjusted to force the yieldable jaw into close frictional contact with the eye-formed end of the temple, and the temple is thus held or confined between the opposing faces of the end piece 12 and the jaw 18, so that the temple cannot sway or move accidentally on the pivot-screw; but at the same time the temple may be adjusted by hand in order to fold the spectacles or to open them previous to adjusting the same to the wearer.

The eye in the flattened end 22 of the temple is of a diameter which slightly exceeds that of the pivot-screw 23, and the temple-eye is thus adapted to turn easily and freely around the screw when the temple is adjusted by hand. It will be noted that the temple is frictionally held by engagement of the end piece and the jaw with the opposite faces of the flattened eye-formed portion 22, and the head of the screw bears upon the jaw, while the screw-shank is held in the aperture of the end piece 12, whereby the screw is not exposed to frictional contact with the end piece, nor is it adapted to work loose by any play or movement of the temple on said screw.

The end pieces 11 12 of the lens-frame may be opened without disturbing the attachment of the temple to the end piece 12 by removing the clamping-screw 14, which permits the end piece 11 to move away from the end piece 12. The lens may be removed from the frame or a new lens may be fitted in said frame, and the end piece 11 should then be adjusted into overlapping relation to the end piece 12 for the purpose of making the aperture 16 fit over the head of the pivot-screw 23 and to bring the aperture 13 into registration with the threaded hole 15, after which the screw 14 should be adjusted and tightened in order to confine the end pieces 11 12 into compact relation for the lens-frame to hold the lens in place. It is evident that the operator may thrust a screw-driver or other tool of small size through the aperture 16 in order to engage with the head 24 of the pivot-screw, and this screw may be removed from the end pieces without manipulating the screw 14, whereby the temple may be detached and replaced without opening the lens-frame.

One of the improved features of my invention is the peculiar construction of the end piece 12 to form a thin integral clamping-jaw and a space for the reception of the eye-formed end of the temple. This construction provides for the ready introduction and clamping of the temple without the necessity for adjusting or manipulating a separate tension device in order to clamp the temple frictionally in place, and it therefore follows that the temple may be applied or disconnected by the simple adjustment of the pivot-screw, thus promoting the assemblage of the parts in the manufacture of spectacle-frames and facilitating repairs thereto. It is evident that the pivot-screw may be tightened more or less to make the jaw and end piece exert the requisite pressure on the temple for holding the latter in place. The improved end piece 12 is very simple in construction and cheap of manufacture, but it is none the less efficient and reliable in service.

I am aware that it is not new to equip a separable lens-frame with overlapping end pieces, also that a screw has been used as a pivot for the temple-bow, and that it is not new in many arts to employ a friction-joint; but these elements are not separately claimed by me. My invention is distinguished from prior devices in this art by a novel construction of one end piece which is necessarily slitted to provide a thin integral yieldable jaw and is formed with a threaded opening, said slitted jaw receiving the flattened eye-formed end of a temple-bow. In my construction it is necessary to employ the binding-screw 24, which passes through the yieldable jaw and has threaded engagement with the threaded opening in the slitted end piece, whereby this screw is made to draw the end piece and yieldable jaw into frictional contact with the temple-bow and to serve as a pivot therefor. This construction is important, because it enables the end piece and jaw thereof to be adjusted in order to compensate for wear on the temple-bow, and said bow is thus frictionally clamped between the end piece and its jaw, so that it will not sway loosely or freely on the pivot formed by the combined clamping and pivotal screw. As it is necessary to employ the clamping and pivotal screw, I find it desirable to house or inclose the head of the screw by loosely socketing thereover the outer end of the other end piece, said end pieces being united separably together by the screw 14. It is evident that the lens-frame may be opened for changing the lenses by removing the screw 14 and slipping the end piece 11 away from the headed end of the screw 24; but this does not involve a disturbance of the friction-joint for the temple-bow, because the screw 24 may remain in position in the end piece 12 when the lens-frame is open. At the same time the screw 24 may be adjusted to increase the frictional contact of the end piece and the yieldable jaw with the temple-bow, because the head of the screw 24 is accessible through the smooth opening 16 in the non-slitted end piece 11.

Having thus described the invention, what is claimed as new is—

1. In spectacles, the combination of a divided lens-frame provided with overlapping end pieces, one of which is slitted, and thereby formed with a yieldable jaw, a temple fitted in the slitted portion of one end piece, and two screws, one of which is screwed in the slitted end piece, to compress the yieldable jaw thereof into frictional engagement with the temple, the other screw serving to unite the two end pieces detachably together, substantially as described.

2. In spectacles, the combination of a divided lens-frame provided with overlapping end pieces, one of which is provided with a temple-screw socket and with a longitudinal slit or kerf forming a thin yieldable jaw disposed parallel to the stiff unyielding part of said end piece, a temple arranged in the slitted portion of one end piece between the stiff portion and the yieldable jaw thereof, a screw connecting the two end pieces separably together, and another screw passing idly through one end piece and having threaded engagement with the temple-screw socket, the head of the last-named screw bearing against the yieldable jaw and pressing the latter into tight frictional engagement with the temple, whereby the temple is frictionally confined in one piece and the two end pieces may be uncoupled by removing one screw without releasing the temple from its frictional engagement with one end piece, substantially as described.

3. In spectacles, the combination of an end piece, 11, having smooth and threaded openings in different vertical planes, an end piece 12, divided at its outer end to form a thin yieldable jaw 18, and having two threaded openings in its solid portions and an unthreaded opening in said yieldable jaw, a temple fitted in the division of the end piece, 12, and engaging with one face of the jaw, 18, a screw 14, connecting the two end pieces, and a screw 24, having threaded engagement with the end piece 12, and bearing on the yieldable jaw to forcibly press the latter into frictional engagement with the temple, said end piece 11, having its smooth opening fitted loosely over and housing the head of the screw, whereby the end pieces may be separated by removing the screw, 14, without disturbing the screw 24, or releasing the friction gripping of the temple, substantially as described.

4. In an eyeglass, the combination of a separable lens-frame having overlapping end pieces, one of which is slitted at its outer end and formed with an integral yieldable jaw, a temple-bow fitted in the slitted end piece only, a clamping-screw 24, having threaded engagement with the slitted end piece only and bearing on the yieldable jaw thereof for holding the temple-bow frictionally in place, the head of the screw being loosely received in an opening of the other end piece, and a screw 14 connecting the two end pieces, whereby the end pieces may be separated to open the lens-frame without disconnecting the temple-bow and the screw 24, may be adjusted for the yieldable jaw and the slitted end piece to compensate for wear and hold the temple-bow under tension at all times, substantially as described.

In testimony that I claim the foregoing as my own I have hereto affixed my signature in the presence of two witnesses.

JOHN CURRIN.

Witnesses:
LEA M. MAYO,
THOMAS J. HEFFERNAN.